June 19, 1962  A. C. ROGERS, JR  3,039,721
FUEL SYSTEM FOR FOLDABLE AIRCRAFT WINGS
Filed May 20, 1960  3 Sheets-Sheet 1

INVENTOR.
A.C. ROGERS, JR.
BY Duane C. Bowen
ATTORNEY

June 19, 1962 A. C. ROGERS, JR 3,039,721
FUEL SYSTEM FOR FOLDABLE AIRCRAFT WINGS
Filed May 20, 1960 3 Sheets-Sheet 2
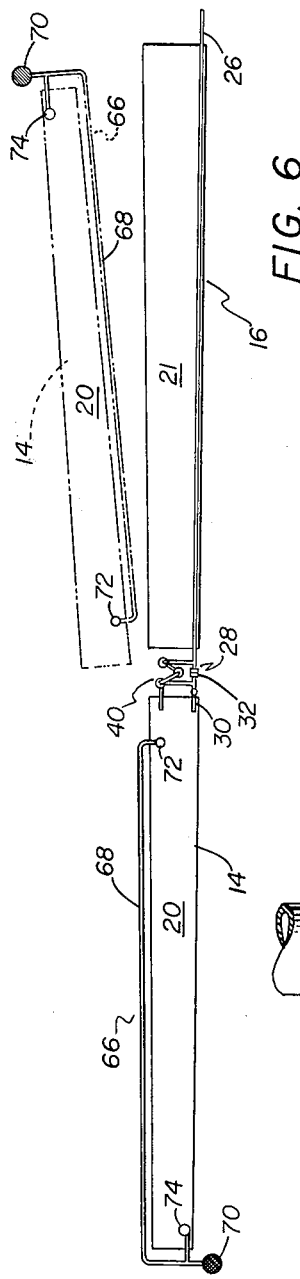
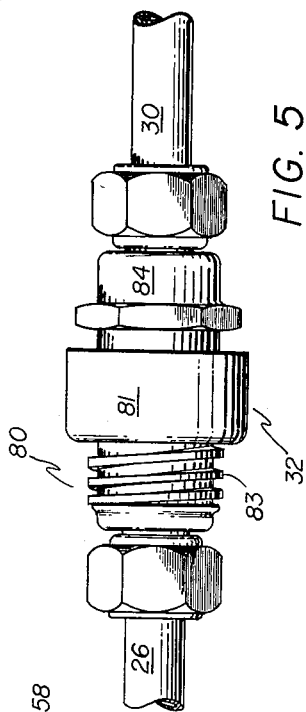
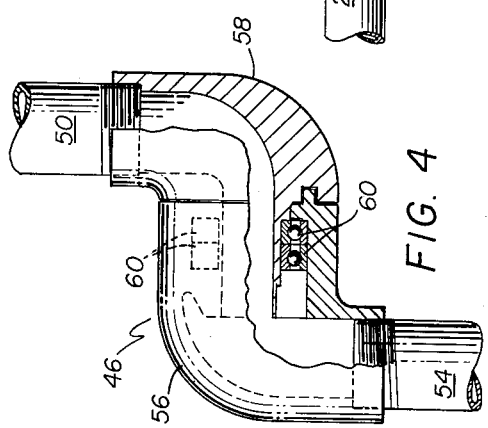
INVENTOR.
A.C. ROGERS, JR.
BY Duane C. Bowen
ATTORNEY June 19, 1962   A. C. ROGERS, JR   3,039,721
FUEL SYSTEM FOR FOLDABLE AIRCRAFT WINGS
Filed May 20, 1960   3 Sheets-Sheet 3
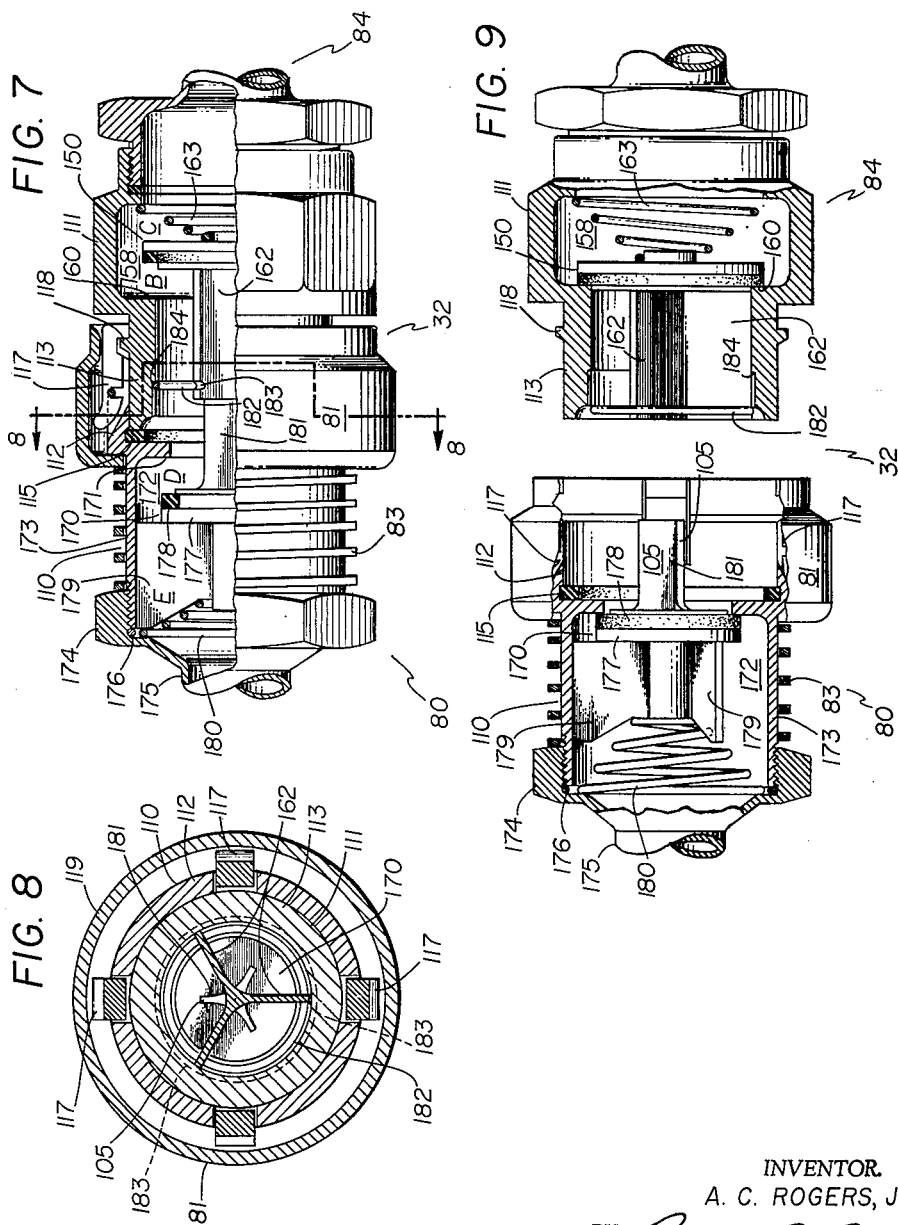
INVENTOR.
A. C. ROGERS, JR.
BY
ATTORNEY

United States Patent Office 3,039,721
Patented June 19, 1962

3,039,721
FUEL SYSTEM FOR FOLDABLE AIRCRAFT WINGS
A. C. Rogers, Jr., Wichita, Kans., assignor to Boeing Airplane Company, Wichita, Kans., a corporation of Delaware
Filed May 20, 1960, Ser. No. 30,659
8 Claims. (Cl. 244—135)

My invention relates to a fuel system for foldable aircraft wings. The fuel system provides for refueling and defueling of outboard wing tanks through a bypass line while the wings are in folded position, and provides for gravity or forced transfer of fuel from outboard tanks through a direct line when the wings are in flight position.

In carrier-based aircraft, folding of wings is a common requirement because of limited space on flight and hangar decks. The outboard sections of the foldable wings frequently contain fuel tanks. In previous aircraft, the fuel lines to the outboard tanks were broken when the wings were folded and refueling could not be accomplished in the folded position.

A principal difficulty in providing fluid continuity across the joint of a folded wing, for refueling and defueling, is that the hinge joint is preferably adjacent to the upper surface of the wing. Room is not available for a pivotal fluid connection aligned with the wing hinge axis.

For efficient carrier operation, it is highly desirable to provide for complete aircraft refueling while wings are folded, such as on the hangar deck. I have devised a fuel system (1) providing direct gravity or forced fuel transfer from outboard tanks while the wings have their normal flight position, and (2) permitting refueling and defueling of outboard tanks, from a central receptacle, through a bypass route while the wings are in folded position. The bypass system is designed so that a pivotal joint aligned with the hinge joint of the wing is not required.

The objects of my invention include: to provide a fuel system for foldable aircraft wings permitting outboard tank refueling and defueling in folded wing positions and providing for direct gravity fuel transfer from outboard tanks in flight; to avoid having a pivotal fuel line joint aligned with the hinge joint of the wing; to devise a bypass fuel system maintaining fluid connection to outboard tanks past the joint of wing folding; to provide for automatic disconnect of direct fuel lines to the outboard tanks upon wing folding but to maintain bypass fuel connections around the disconnected fuel line couplings; to provide for outboard tank drainage through the central fuel system while the wings are folded; and to provide for the above in a simple, efficient and economical structure.

My invention will be understood, together with additional advantages and objectives thereof, from the following description and from the drawings, in which:

FIGURE 4 is a simplified enlarged half-sectional view of one of the swivel couplings;

FIGURE 5 is a simplified view of the conventional automatic tension disconnect coupling shown in FIGURE 2;

FIGURE 6 is a schematic elevation view of fuel tank, fuel lines and vent details of the fuel system, flight position being in full lines and folded position being partly in dotted lines;

FIGURE 7 is an elevational view partly in section, showing details of a coupling generally like that shown in FIGURE 5;

FIGURE 8 is a section taken on line 8—8 of FIGURE 7; and

FIGURE 9 is a view showing the coupling of FIGURE 7 disconnected.

Figure 1:
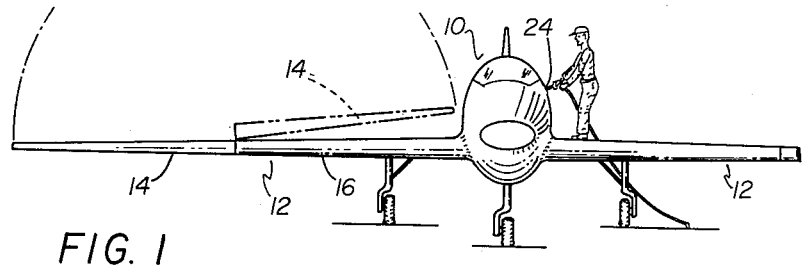
FIGURE 1 is a front elevation view of a foldable wing aircraft showing in phantom lines a wing in folded position.

FIGURE 1 shows an aircraft 10 having foldable wings 12. Outboard wing sections 14 are pivotally connected to the inboard wing sections 16 by hinges (shown in simplified form at 18), and are foldable upwardly and inwardly from a flight position to a folded position. Each outboard wing section 14 has at least one tank 20 (FIGURE 2) that may be of integral or rubber fuel cell type. The expression "tank" is defined for the purpose of the specification and claims as being generic to integral tanks and installed rubber fuel cells. Inboard wing section 16 has one or more tanks 21.

Such foldable wings are most often used on carrier-based aircraft. A common procedure is to fold wings to minimize lateral space requirements immediately after landing. Then the plane is moved on an elevator from the flight deck to the hangar deck for service and maintenance such as inspection, repair, refueling, etc.

Refueling of outboard tank 20, in normal position or folded, may be accomplished from inboard of the pivotal joint 18 according to my invention. The preferred design in many aircraft is to provide complete refueling through a single central receptacle, as at 24 in FIGURE 1. Auxiliary gravity feed receptacles may be provided directly to tanks 20, 21 in outboard and inboard sections of wings 12. However, the use of a central receptacle in regular operations is preferred in most large aircraft, for reasons such as time savings in refueling, and individual auxiliary receptacles are used only in case of malfunctioning of the central refueling system or of the pressurized fuel source.

A feed line 26 extends from central receptacle 24 toward outboard tank 20. Valves, sump and other central system means are usually interposed between receptacle 24 and line 26 for refueling, engine fuel supply and other purposes, but such central system details take various forms and do not form a part of this invention. Feed line 26 may extend through inboard tank 21 but normally will not be in fluid connection therewith.

As a convenience in description, the fluid line across the joinder between outboard and inboard wing sections 14, 16 is termed a direct transfer fuel line and is given the reference character 28. Direct transfer line 28 is formed by the outboard end of feed line 26, a line 30 connecting to the inboard end of outboard tank 20, and a disconnect coupling 32. The presentation is partly schematical and seals and fittings are not shown. As will be described in more detail later, coupling 32 separates and the ends automatically seal when outboard wing section 14 is pivoted upwardly from normal flight position to folded position.

In the system illustrated, a check valve 34, preventing flow into tank 20 through line 30, is interposed in the line between disconnect coupling 32 and outboard tank 20. This valve prevents gravity backfeeding of fuel into outboard tank 20 in the normal circumstance after tank 20 is emptied in which the level of fuel in connected tanks and lines is below the bottom of line 38. Such gravity backfeeding might otherwise occur under certain fuel system operations, such as transfer of fuel between tanks for aircraft balancing after tank 20 has been emptied. Although the need for this valve is avoided in some central distribution systems, it is a desirable expedient in many common systems.

Check valve 34, when used, prevents refueling of tank 20 through line 30 regardless of the position of wing 12. Refueling is accomplished through a branch line 36 that connects with an inlet to the top of tank 20. Feed out of tank 20 is accomplished through line 30 past check valve 34, past disconnect coupling 32, and through line 26 for direct gravity feed. It will be understood that forced fuel feed, with a pump, may be used in the system illustrated instead of gravity feed, according to the choice of fuel system design, but gravity feed is often desirable.

The direct transfer fuel system described above is inoperative for refueling or defueling while outboard wing section 14 is in folded position. These functions in folded position are accomplished by use of a bypass line 40 maintaining fluid communication continuity to outboard tank 20 across the discontinuity caused by separation of disconnect coupling 32 of direct transfer line 28.

While it would be possible to design a foldable wing in which the wing hinge axis and the pivotal axis of a swivel coupling were coincident, this is not a feasible structural arrangement in most aircraft because of substantial interference between wing structural parts upon folding if the hinge axis is spaced below the upper wing surface a distance substantial enough to permit housing a swivel fuel line coupling coincident with the hinge axis. If both the hinge and swivel coupling axes were substantially on the wing upper surface, then a housing protruding outside of the normal airfoil profile would be necessary to house the coupling. The structure of my invention avoids this problem.

Bypass line 40 is preferably constructed as shown in the drawings. This configuration has several advantages: the bypass line uses proven mechanical expedients such as swivel couplings, it permits positioning of direct line 28 in the lower part of the wing for gravity feed, and space, complexity and cost are minimized. Although gravity feed is a desirable capability, it will be understood that my fuel system is equally operative with forced fuel supply by pumps.

Figure 2:
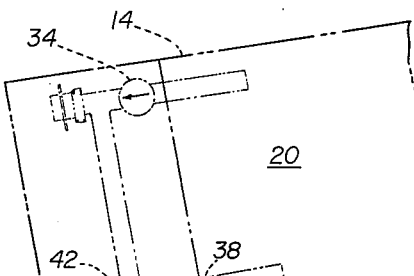
FIGURE 2 is an enlarged fragmentary elevation view of a fuel system forming a specific embodiment of my invention, the wing in flight position being shown in full lines and the folded position of the outboard wing section being shown in dotted lines.
Figure 3:
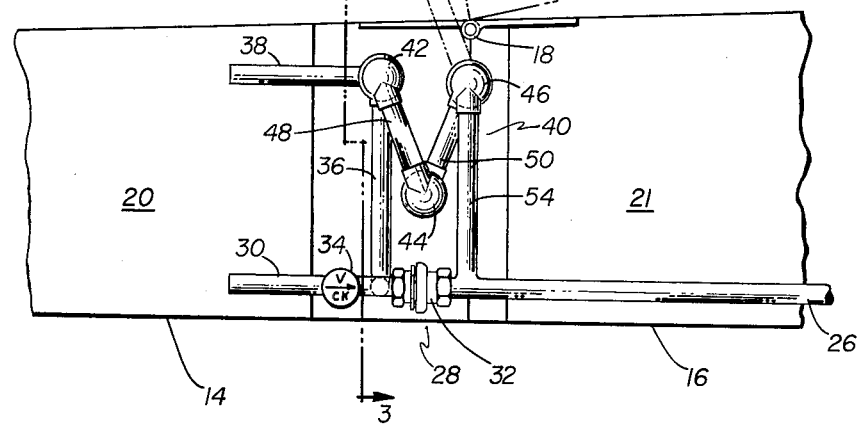
FIGURE 3 is a view, taken on line 3—3 of FIGURE 2, certain parts being given a removed position to show structure that otherwise would be hidden.
Figure 3:
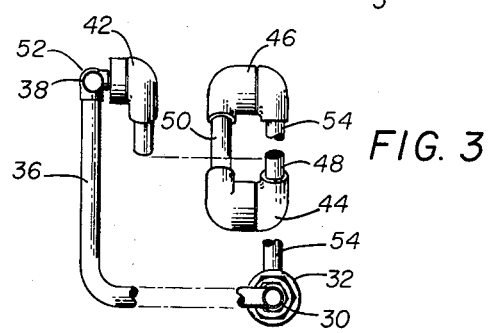

The bypass system may be characterized as having an upwardly open V configuration, as viewed in FIGURE 2, defined by three swivel couplings 42, 44, 46 and two connecting pivotal tube link segments 48, 50. Swivel coupling 42 is located offset from the juncture of branch line 36 and inlet line 38 and in fluid communication therewith through a fitting 52. Swivel coupling 46 connects with direct line 28 through upstanding tube 54.

The pivotal axes of swivel couplings 42, 44, 46 are parallel to the hinge axis 18 of wing 12. As shown in FIGURE 2, links 48, 50 are automatically pivoted during wing folding and unfolding.

While the configuration of the components of the V-shaped bypass line 40 is desirable, strict adherence to the relationship and position of the components as shown in the drawings is not necessary. The exact relationship and position of the V configuration components is dependent on several factors of design, e.g., type of hinge and location of hinge axis, placement of the fuel line within the wing, and the angle of folding of wing 12.

The swivel couplings 42, 44, 46 may be of conventional construction and one common type is illustrated in FIGURE 4. The coupling 46 of FIGURE 4 has two sections 56, 58, each having the form of an elbow in this coupling. Coupling 42 has one elbow and one straight section. Sections 56, 58 are pivotally connected together by means including a ball bearing 60 and associated securing means conventional in the art. The connecting tubes 50 and 54 are secured in swivel coupling sections 56, 58 by a threaded connection or by other suitable means.

Fuel line 38 enters tank 20 adjacent the top thereof in wing flight position. This is necessary for defueling by gravity feed in the inverted position of tank 20 (when wing 12 is folded) as fuel line 38 will then enter the tank at the lowermost point thereof. A fuel pump of course may be used if desired.

A vent system for tank 20 is briefly shown and described as this is a necessary component of most fuel systems. The preferred form of vent system 66 is shown in FIGURE 6. The vent system is shown in solid lines in flight position and in phantom lines in wing folded position. The system includes a line 68, a screened vent 70 connecting with line 68, and two weight actuated valves 72, 74 at the ends of line 68. Valves 72, 74 are positioned in opposite corners of tank 20 as viewed in FIGURE 6. Valve 72, at an upper point in tank 20 in flight position, is normally open, and is closed when tank 20 is inverted, when wing 12 is folded. Valve 74 is normally closed with wing 12 in flight position and is moved to open position by its weight when wing 12 is folded. Valve 74 is disposed in the outboard end and lower portion of tank 20 in flight position and is at the upper portion when tank 20 is inverted, as when wing 12 is folded. The positioning of the valves 72, 74 as described allows venting for maximum filling of tank 20 in either flight or folded position and also serves other vent functions.

FIGURE 5 shows the general configuration of an automatic disconnect coupling 32. The coupling 32 generally illustrates a coupling commercially available from the E. B. Wiggins Manufacturing Co., Los Angeles, California. Although the external appearance is somewhat modified, the Wiggins coupling is constructed and operated substantially as described in Wiggins Patent No. 2,425,500. The female, latching portion 80 is supported by fuel line 26 and is adapted for manual release and reconnection by movement of ring 81 against spring 83, as more fully described in the Wiggins patent. The male portion 84, on the outboard end of the disconnect coupling, is supported by tubes 30, 36.

The Wiggins coupling of the type shown and referenced automatically seals upon disconnection and automatically opens for fluid flow when male portion 84 is inserted into female portion 80. The coupling may be manually latched and unlatched through an access panel in the lower wing skin. A disconnect coupling automatically releasing and/or reconnecting upon wing folding and unfolding, as well as automatically sealing, may be substituted. Various products of this type are patented or marketed, i.e., the modification 131 of FIGURE 1 of the Wiggins patent, Bruning Patent No. 2,666,656 automatic disconnection), and a self-sealing quick-disconnect coupling 3QD1600 manufactured by Allen Aircraft Products, Inc., Ravenna, California.

FIGURES 7, 8 and 9 (generally following the construction of the coupling shown in FIGURES 7, 8 and 9 of Patent 2,425,500) further detail a particular construction of coupling 32 incorporating a pair of valves for automatically closing both conduits 30, 26. The general structure comprises a pair of tubular members 110 and 111 with telescoping extensions 112 and 113, a sealing ring 115, locking dogs 117 cooperating with a shoulder 118 and an operating ring 81. The member 111 is provided with a valve 150 having guide wings 162 and which operates to close the passage through the member 111 when the members 110 and 111 are separated. To unseat valve 150, the wings 162 engage another and similar valve 170 in the member 110, the valves operating to mutually and substantially simultaneously unseat each other when the members are coupled. The extension 112 is provided with a ported wall forming a seat 171 for the valve 170, which is accommodated in a chamber 172 formed on the extension 112 by a cylindrical wall 173. This chamber is closed by an interiorly threaded cap 174 with a reduced end 175 that may have conduit 26 secured thereto in some manner. A suitable gasket 176 is interposed between the cap 174 and the end face of the wall 173. The valve 170 includes a head or body portion 177 with a resilient facing 178 for cooperating with the seat 171, and guiding wings 179 which cooperate with the inner surface of the wall 173 to guide the valve for axial movement. By threading the cap 174 on the exterior of the wall 173, it is possible to provide for the necessary movement of the valve 170 as well as to have the wings 179 sufficiently long to satisfactorily guide the valve without having a long coupling member. A compression spring 180 confined between the valve 170 and the cap 174 urges the valve 170 to seat.

It will be apparent that when the members 110 and 111 are separated as shown in FIGURE 9, the valve 150 will be urged to its seat 160 by the spring 163, closing the opening through the member 111, and the valve 170 will be urged to its seat 171 by the spring 180, closing the opening through the member 110. When the members 110 and 111 are coupled, as shown in FIGURE 7, the ends of the wings 162 of the valve 150 engage the end of an extension 181 on the valve 170 and the valves are mutually unseated, opening the passage through the members 110 and 111. To prevent the valve 150 being moved so far inwardly of the chamber 158 as to restrict the opening between the chamber and the associated conduit, a stop is provided which comprises a spring ring 182 encircling the wings 162 and suitably secured thereto, as by engaging a groove 183 formed in the wings and adapted to engage a shoulder 184 in the extension 113 upon a desired movement of the valve 150.

Means are also provided to limit the movement of the valve 170 away from its seat 171 to insure against restriction of the opening between the chamber 172 and the conduit connected to the member 110. Thus, the wings 179 are arranged to engage the outermost coil of the spring 180, which is in contact with the cap 174. This limits the opening movement of the valve 170. The arrangement is such that, as will be apparent from an inspection of FIGURE 7, when the members 110 and 111 are connected, the wings 162 of the valve 150 and the extension 181 of the valve 170 are in contact, valve 150 is substantially at the limit of its movement due to the engagement of the ring 182 with the shoulder 184 and the valve 170 is also substantially at the limit of its movement with the wings 179 in engagement with the outer coil of the spring 180. It will be understood that appropriate clearances must be provided on the contacting parts to allow for manufacturing tolerances as well as the resilience of the sealing ring 115. However, these clearances are so small as to be of no effect on the important advantages of this arrangement which will now be pointed out. The forces exerted by the springs 180 and 163 urging the respective valves 170 and 150 toward closed position also urges members 110 and 111 apart and thus in a similar manner assists the resilience of the sealing ring 115 in retaining dogs 117 in coupling position.

The necessity of preventing excessive movement of the valve member from its seat has just been explained; it is also necessary that the valve member be moved a sufficient distance from its seat to provide proper opening between the valve and its seat. As previously mentioned, it is desirable that the valve member when unseated, be always moved to a predetermined position. The described arrangement insures that each valve member 170 or 150 will always assume a predetermined position in its respective chamber 172 or 158 when unseated in response to coupling of the members 110 and 111, without the need of providing carefully balanced springs 180 and 163 for seating the valves. This position can be so determined that a minimum restriction occurs in the coupling members 110 and 111 of a given length of chamber 172 or 158. Thus, referring to FIGURE 7 it will be seen that the passage B between valve member 150 and the opening through the seat 160 is substantially unobstructed while the passage C between the valve member 150 and the opening between the conduit and chamber 158 is somewhat obstructed by the spring 163. Accordingly, for optimum results, in its open position the valve member 150 must be placed to substantially equalize the effective openings of passages B and C, due to regard being had to friction losses. Tests have shown that a small deviation from such optimum position results in a marked loss of fluid handling capacity of the coupling. A somewhat similar situation exists in connection with the valve member 170, it being desirable to accurately position it when open to equalize the passages D and E. The disclosed arrangement serves to accurately move the valve members to open position.

Another important feature of this arrangement is that the valve members when open are positively held against movement in either direction. Thus, the fluid even if flowing through the coupling at a great velocity, is prevented from moving either valve member by itself or the pair of valve members as a unit toward or away from the seats in the manner of a check valve, with resulting restrictions in the fluid flow.

The provision of the extension 181 on the valve member 170 enables the use of wings 162 on the other valve member 150 which are of such length as to be wholly within the coupling member 111 carrying the valve member, when the valve member is seated. Thus, as clearly shown in FIGURE 9, the ends of the wings 162 of the valve member 150 are substantially flush with the face of the tubular extension 113, when the coupling members 110 and 111 are separated and the valve member 150 is seated. Similarly, the extension 181 is wholly within the tubular extension 112 of the member 110 when the valve member 170 is seated. This is an important advantage since in this way accidental unseating of either valve member 150 or 170 is prevented and possibility of damage to the wings or valve members is avoided.

By referring to FIGURE 8 it will be seen that the extension 181 is formed of wings 105 which do not materially obstruct the flow of fluid past the wings 162 regardless of the relative angular positions of the valve members 170 and 150. Hence it is not necessary to provide any means for angularly positioning the valve members 170 and 150 or coupling members 110 and 111 in any definite relationship when the coupling members are connected.

A summary of refueling and defueling operations will be given with wing 12 (1) in the folded or normal refueling position, and (2) in the extended or flight position. In both cases, a pressurized fuel source preferably is connected at a single point for refueling, such as central refueling receptacle 24.

In the wing folded position, the fuel under pressure passes through fuel line 26 to the separated disconnect coupling 32 which is automatically sealed when disconnected. The fuel flow is forced upward through line 54, coupling 46, tube link 50, coupling 44, tube link 48, coupling 42 and line 38 to tank 20. Gravity defueling is accomplished by the same route in the opposite direction.

When refueling with wing 12 in flight position, disconnect coupling 32 is joined and is open for fluid passage. Fuel passes through line 26 and disconnect coupling 32, check valve 34 prevents the flow of fuel into tank 20 through line 30, and the fuel is forced up through lines 36 and 38 to tank 20. Gravity defueling or engine fuel supply is accomplished from tank 20, through line 30, past check valve 34, past disconnect coupling 32, to line 26.

Having thus specifically described my invention, I do not wish to be understood as limiting myself to the precise details of construction shown, but instead wish to cover those modifications thereof which will occur to those skilled in the art from my disclosure and which fall within the scope of my invention, as described in the following claims.

I claim:
1. The improvement in the fuel system of a foldable wing having an inboard and an outboard section, said outboard section including at least one fuel tank, said outboard section having a hinged connection to said inboard section whereby said outboard section is foldable upwardly and inwardly from a flight position extending outboard of said inboard section to an upper folded position, comprising: said hinged connection being adjacent to the upper surface of said wing, fuel transfer means extending inboard from said tank including a direct transfer line and a by-pass line, said fuel transfer means being used to transfer fuel between said tank and the fuel system inboard of said outboard section, said direct line being straight and extending directly between said inboard and outboard sections in a lower position below said hinged connection and connecting to the bottom of said tank in wing flight position for gravity feed of fuel inboard from said tank, said direct line having a disconnect coupling interposed therein operable to be separated and to seal the ends of said direct line at said coupling when said outboard section is folded to said upper position, said bypass line having a position above said direct line and below said hinged connection and connecting with the top of said tank in said flight position, said bypass line including coupling means having a first folded position spaced from said hinged connection in said flight position of said outboard section and having a second extended position in said folded position of said outboard section maintaining fluid connection between said fuel transfer means and said tank, whereby said outboard section can be folded without breaking the continuity of said bypass fuel line, thereby permitting refueling and gravity defueling of said tank through said bypass line when said wing is folded.

2. The improvement in the fuel system of a foldable wing having an inboard and an outboard section, said outboard section including at least one fuel tank, said outboard section having a hinged connection to said inboard section whereby said outboard section is foldable upwardly and inwardly from a flight position extending outboard of said inboard section to an upper folded position, comprising: fuel transfer means extending inboard from said tank including a direct transfer line and a bypass line, said fuel transfer means being used to transfer fuel between said tank and the fuel system inboard of said outboard section, said direct line extending directly between said inboard and outboard sections in a lower position connecting to the bottom of said tank adaptable for gravity feed of fuel inboard from said tank in said flight position, said direct line having a disconnect coupling interposed therein operable to be separated and to seal the ends of said direct line at said coupling when said outboard section is folded to said upper position, said bypass line having a position above said direct line and connecting with the top of said tank in said flight position, said bypass line including coupling means have three swivel couplings interconnecting two pivotal link segments of said bypass line having a first folded position of V configuration in said flight position of said outboard section and having a second extended position in said folded position of said outboard section maintaining fluid connection between said fuel transfer means and said tank, whereby said outboard section can be folded without breaking the continuity of said bypass fuel line, thereby permitting refueling and defueling of said tank through said bypass line when said wing is folded.

3. The improvement in the fuel system of a foldable wing having an inboard and an outboard section, said outboard section including at least one fuel tank, said outboard section having a hinged connection to said inboard section whereby said outboard section is foldable upwardly and inwardly from a flight position extending outboard of said inboard section to an upper folded position, comprising: fuel transfer means extending inboard from said tank including a transfer line and a bypass line, said fuel transfer means being used to transfer fuel between said tank and the fuel system inboard of said outboard section, said transfer line extending between said inboard and outboard sections for feed of fuel inboard from said tank when said outboard section is in said flight position, said transfer line having a disconnect coupling interposed therein operable to be automatically separated and operable to automatically seal the ends of said transfer line at said coupling when said outboard section is folded to said upper position, said bypass line being connected with said tank and including coupling means having a first folded position in said flight position of said outboard section and having a second extended position in said folded position of said outboard section maintaining fluid connection between said fuel transfer means and said tank, whereby said outboard section can be folded without breaking the continuity of said bypass fuel line, thereby permitting refueling and defueling of said tank through said bypass line when said wing is folded.

4. The subject matter of claim 3 in which said coupling means of said bypass line includes three swivel couplings interconnecting two pivotal link segments of said bypass line having a V configuration in said folded position of said bypass line, the pivotal axes of said swivel couplings being parallel to the axis of said hinged connection of said wing.

5. The improvement in the fuel system of a foldable wing having an inboard and an outboard section, said outboard section including at least one fuel tank, said outboard section having a hinged connection to said inboard section whereby said outboard section is foldable upwardly and inwardly from a flight position extending outboard of said inboard section to an upper folded position, comprising: fuel transfer means extending inboard from said tank including a transfer line and a bypass line, said fuel transfer means being used to transfer fuel between said tank and the fuel system inboard of said outboard section, said transfer line extending between said inboard and outboard sections for feed of fuel inboard from said tank when said outboard section is in said flight position, said transfer line having a coupling interposed therein operable to be separated and having means operable to seal the ends of said transfer line when said outborad section is folded to said upper position, said bypass line being spaced from said hinged connection and being connected with said tank and maintaining fluid connection with said tank in said folded position of said outboard section, thereby permitting refueling and defueling of said tank through said bypass line when said wing is folded.

6. The subject matter of claim 5 in which said coupling is of an automatic disconnect type automatically sealing the ends of said transfer line at said coupling when said coupling is separated.

7. The improvement in the fuel system of a foldable wing having an inboard and an outboard section, said outboard section including at least one fuel tank, said outboard section having a hinged connection to said inboard section whereby said outboard section is foldable upwardly and inwardly from a flight position extending outboard of said inboard section to an upper folded position, comprising: fuel transfer means extending inboard from said tank used to transfer fuel between said tank and the fuel system inboard of said outboard section, said fuel transfer means including fluid connection means across the plane of joinder of said outboard and inboard sections spaced from the axis of said hinged connection and maintaining fluid connection in both said flight position and said upper folded position of said outboard section, said fluid connection means including two pivotal link segments and three swivel couplings disposed at the ends of said segments and therebetween, the pivotal axes of said swivel couplings being parallel to said axis of said hinged connection of said outboard and inboard sections, said segments having a first folded position in said flight position of said outboard section and having a second extended position in said folded position of said outboard section whereby said fluid connection means extends and folds responsive respectively to folding and unfolding of said wing thereby maintaining fluid continuity with said tank and permitting refueling and defueling of said tank when said wing is folded.

8. The improvement in the fuel system of a foldable wing having an inboard and an outboard section, said outboard section including at least one fuel tank, said outboard section having a hinged connection to said inboard section whereby said outboard section is foldable upwardly and inwardly from a flight position extending outboard of said inboard section to an upper folded position, comprising: fuel transfer means extending inboard from said tank used to transfer fuel between said tank and the fuel system inboard of said outboard section, said fuel transfer means including fluid connection means across the plane of joinder of said outboard and inboard sections spaced from the axis of said hinged connection and maintaining fluid connection in both said flight position and said upper folded position said outboard section, whereby said outboard section can be folded without breaking the continuity of said fuel transfer means thereby permitting refueling and defueling of said tank when said wing is folded, said fluid connection means includes coupling means having a first folded position in said flight position of said outboard section and having a second extended position in said folded position of said outboard section whereby said coupling means extends and folds responsive respectively to folding and unfolding of said wing, said fluid connection means including a transfer line extending from said tank in an inboard direction more directly than said coupling means and disposed in said fluid connection means in parallel with said coupling means, said transfer line being operable to separate and for the separated ends of the transfer line to be sealed when said outboard section is moved from flight to folded position whereby said coupling means is used for fuel transfer in said folded position of said wing and said transfer line may be used for fuel transfer in said flight position of said wing.

References Cited in the file of this patent

UNITED STATES PATENTS

| | | |
|---|---|---|
| 1,274,134 | Brennan et al. | July 30, 1918 |
| 2,105,307 | Akerman | Jan. 11, 1938 |
| 2,301,183 | Martin | Nov. 10, 1942 |
| 2,425,500 | Wiggins | Aug. 12, 1947 |
| 2,666,656 | Bruning | Jan. 19, 1954 |
| 2,943,868 | Hanback | July 5, 1960 |

FOREIGN PATENTS

| | | |
|---|---|---|
| 966,031 | France | Mar. 1, 1950 |